(12) United States Patent
Li (10) Patent No.: US 12,105,660 B2
(45) Date of Patent: Oct. 1, 2024

(54) ELECTRONIC APPARATUS AND COMMUNICATION METHOD THEREOF HAVING BOTH DEFINED AND UNDEFINED BUS COMMUNICATION MECHANISM

(71) Applicant: REALTEK SEMICONDUCTOR CORPORATION, Hsinchu (TW)

(72) Inventor: Yang Li, Suzhou (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 47 days.

(21) Appl. No.: 18/143,092

(22) Filed: May 4, 2023

(65) Prior Publication Data

US 2023/0359575 A1 Nov. 9, 2023

(30) Foreign Application Priority Data

May 9, 2022 (CN) .......................... 202210497744.3

(51) Int. Cl.
*G06F 13/40* (2006.01)
*G06F 13/38* (2006.01)

(52) U.S. Cl.
CPC ........ *G06F 13/4072* (2013.01); *G06F 13/385* (2013.01)

(58) Field of Classification Search
CPC ........................... G06F 13/4072; G06F 13/385
See application file for complete search history.

(56) References Cited

U.S. PATENT DOCUMENTS

| | | | |
|---|---|---|---|
| 2011/0029709 A1* | 2/2011 | Feiereisel | G06F 13/385 710/305 |
| 2013/0179619 A1* | 7/2013 | Whetsel | G06F 13/4022 710/305 |
| 2021/0129772 A1* | 5/2021 | Shi | G06F 13/4072 |

FOREIGN PATENT DOCUMENTS

EP 0695993 A2 2/1996

OTHER PUBLICATIONS

OA letter of a counterpart TW application (appl. no. 111127123) mailed on Aug. 17, 2023.
(Continued)

*Primary Examiner* — Henry Tsai
*Assistant Examiner* — John B Roche
(74) *Attorney, Agent, or Firm* — WPAT, P.C (57) ABSTRACT

The present invention discloses a communication method having both defined and undefined bus communication mechanism used in an electronic that includes steps outlined below. A connection between an application program and the peripheral electronic equipment is established through a built-in driver. A proxy library and a proxy driver respectively corresponding to a user mode and a kernel mode are activated by the application program. A connection between a combination of the proxy library and the proxy driver and the peripheral electronic equipment are established by the application program. Defined commands defined by the built-in driver are transmitted to and received from the peripheral electronic equipment through a bus by the application program by using the built-in driver. Non-defined commands not defined by the built-in driver are transmitted to and received from the peripheral electronic equipment through the bus by the application program by using the proxy library and the proxy driver.

18 Claims, 5 Drawing Sheets

(56) References Cited

OTHER PUBLICATIONS

Kevin Burns et al., "KairosVM: Deterministic Introspection for Real-time Virtual Machine Hierarchical Scheduling," Proceedings of the 2014 IEEE Emerging Technology and Factory Automation (ETFA), Sep. 16-19, 2014. https://eeexplore.IEEE.org/document/7005061.

* cited by examiner

ELECTRONIC APPARATUS AND COMMUNICATION METHOD THEREOF HAVING BOTH DEFINED AND UNDEFINED BUS COMMUNICATION MECHANISM

BACKGROUND OF THE INVENTION

1. Field of the Invention

The present invention relates to an electronic apparatus and a communication method thereof having both defined and undefined bus communication mechanism.

2. Description of Related Art

Universal serial bus (USB) is a widely used interface, in which the popularity of USB is highly related to the convenience thereof. Equipments having USB interface support functions of hot-plugging and plug-and-play. In other words, after being plugged to a computer, the equipments having USB interface can be used directly without the need to reboot the system.

The convenience of USB is brought based on not only the support of the hardware, but also the supply of built-in inbox USB class drivers for various kinds of USB standard class equipments from the operation systems. However, though the standard drivers bring the convenience, these drivers also limit the types of operations that the application program can perform on the equipments having USB interface. Further, non-defined commands are not allowed. Such a design reduces elasticity of the usage of the equipment.

SUMMARY OF THE INVENTION

In consideration of the problem of the prior art, an object of the present invention is to supply an electronic apparatus and a communication method thereof having both defined and undefined bus communication mechanism.

The present invention discloses an electronic apparatus having both defined and undefined bus communication mechanism that includes a peripheral electronic equipment, a bus, a storage circuit and a processing circuit. The storage circuit is configured to store a computer executable command. The processing circuit is configured to retrieve and execute the computer executable command to execute a communication method that includes steps outlined below. A connection between an application program and the peripheral electronic equipment is established through a built-in driver operated in an operation system, wherein the application program is related to the peripheral electronic equipment. A proxy library and a proxy driver are activated by the application program, wherein the proxy library corresponds to a user mode of the operation system and the proxy driver corresponds to a kernel mode of the operation system. A connection between a combination of the proxy library and the proxy driver and the peripheral electronic equipment are established by the application program. Transmitting and receiving of defined commands that are defined by the built-in driver are performed through the bus with the peripheral electronic equipment by the application program by using the built-in driver. Transmitting and receiving of non-defined commands that are not defined by the built-in driver are performed with the peripheral electronic equipment by the application program by using the proxy library and the proxy driver.

The present invention also discloses a communication method having both defined and undefined bus communication mechanism used in an electronic apparatus that includes steps outlined below. A connection between an application program and a peripheral electronic equipment is established through a built-in driver operated in an operation system of the electronic apparatus, wherein the application program is related to the peripheral electronic equipment. A proxy library and a proxy driver are activated by the application program, wherein the proxy library corresponds to a user mode of the operation system and the proxy driver corresponds to a kernel mode of the operation system. A connection between a combination of the proxy library and the proxy driver and the peripheral electronic equipment are established by the application program. Transmitting and receiving of defined commands that are defined by the built-in driver are performed through a bus with the peripheral electronic equipment by the application program by using the built-in driver. Transmitting and receiving of non-defined commands that are not defined by the built-in driver are performed with the peripheral electronic equipment by the application program by using the proxy library and the proxy driver.

These and other objectives of the present invention will no doubt become obvious to those of ordinary skill in the art behind reading the following detailed description of the preferred embodiments that are illustrated in the various figures and drawings.

DETAILED DESCRIPTION OF THE PREFERRED EMBODIMENTS

An aspect of the present invention is to provide an electronic apparatus and a communication method thereof having both defined and undefined bus communication mechanism to perform communication of non-defined commands by disposing a proxy library and a proxy driver such that the communication of standard defined commands is not affected and drivers are not required to be newly designed.

Figure 1:
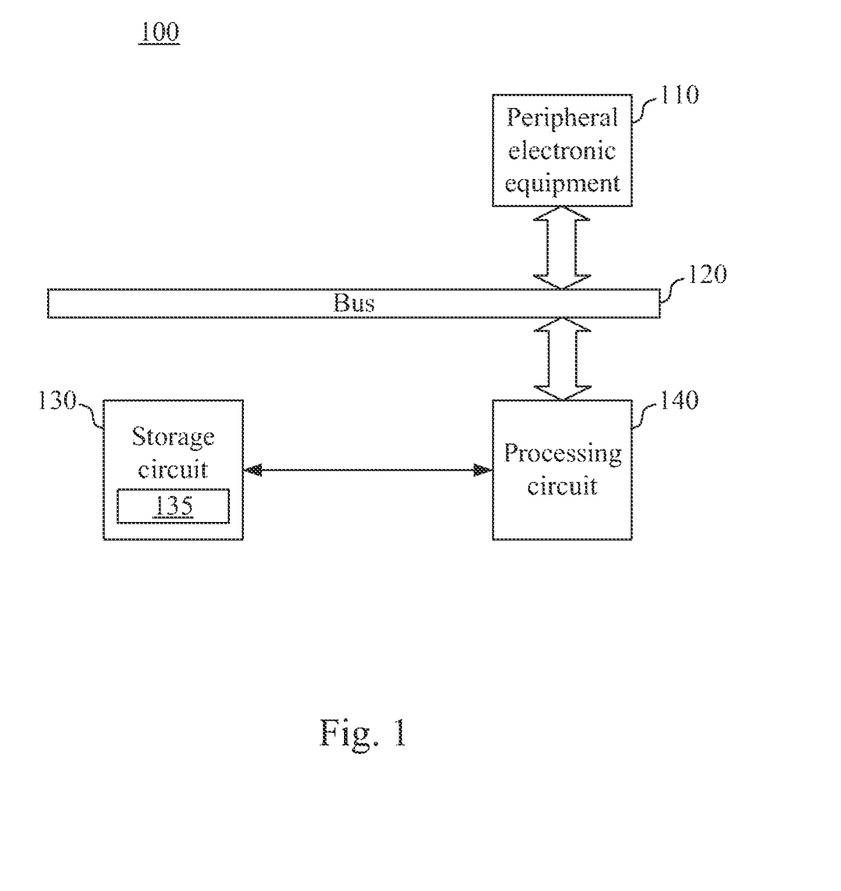
FIG. 1 illustrates a block diagram of an electronic apparatus having both defined and undefined bus communication mechanism according to an embodiment of the present invention.

Reference is now made to FIG. 1. FIG. 1 illustrates a block diagram of an electronic apparatus 100 having both defined and undefined bus communication mechanism according to an embodiment of the present invention. The electronic apparatus 100 includes a peripheral electronic equipment 110, a bus 120, a storage circuit 130 and a processing circuit 140.

The peripheral electronic equipment 110 is a device having a data transmission interface matching the protocol of the bus 120 and is able to be accessed by the processing circuit 140 through the bus 120. In an embodiment, the bus 120 is universal serial bus (USB). The peripheral electronic equipment 110 can be such as, but not limited to a storage equipment, a digital image-retrieving equipment or other types of equipment having USB interface. It is appreciated that the number of the peripheral electronic equipment 110 included in the electronic apparatus 100 can be one or more than one and is not limited by the number in FIG. 1.

The storage circuit 130 can be any storage device that is configured to store data, such as but not limited to a random access memory (RAM), a read only memory (ROM) or a hard disk. It is appreciated that in different embodiments, the storage circuit 130 may include one or more than one storage devices described above to store different types of data. In an embodiment, the storage circuit 130 is configured to store a computer executable command 135.

The processing circuit 140 is electrically coupled to the storage circuit 130. In an embodiment, the processing circuit 140 is configured to retrieve and execute the computer executable command 135 from the storage circuit 130. The computer executable command 135 includes such as, but not limited to firmware/driver, commands and application programs related to the hardware of the peripheral electronic equipment 110, the bus 120 and the storage circuit 130. The processing circuit 140 can access the signal or data of the peripheral electronic equipment 110, the bus 120 and the storage circuit 130 by executing the computer executable command 135 to perform the function of the electronic apparatus 100.

Figure 2:
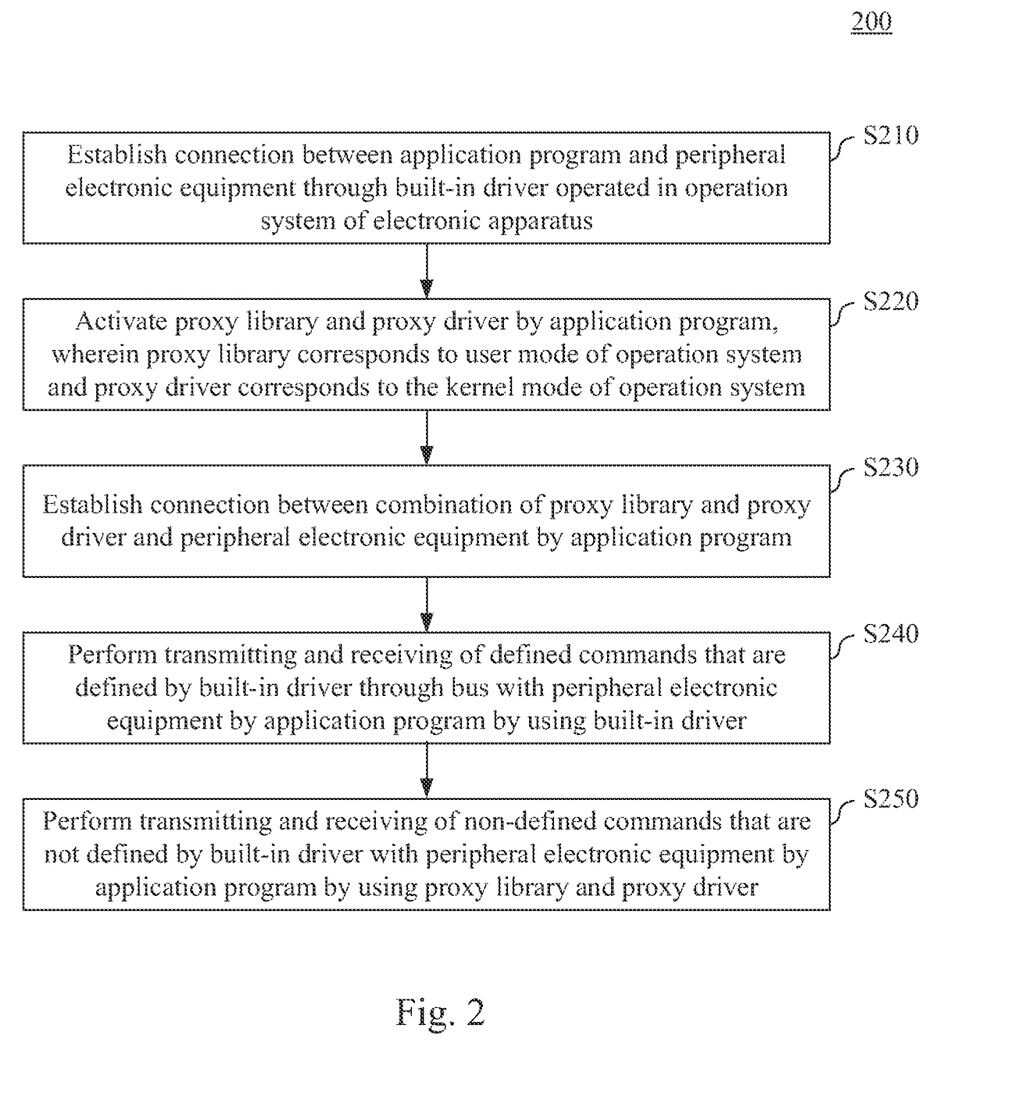
FIG. 2 illustrates a flow chart of a communication method having both defined and undefined bus communication mechanism according to an embodiment of the present invention.
Figure 3:
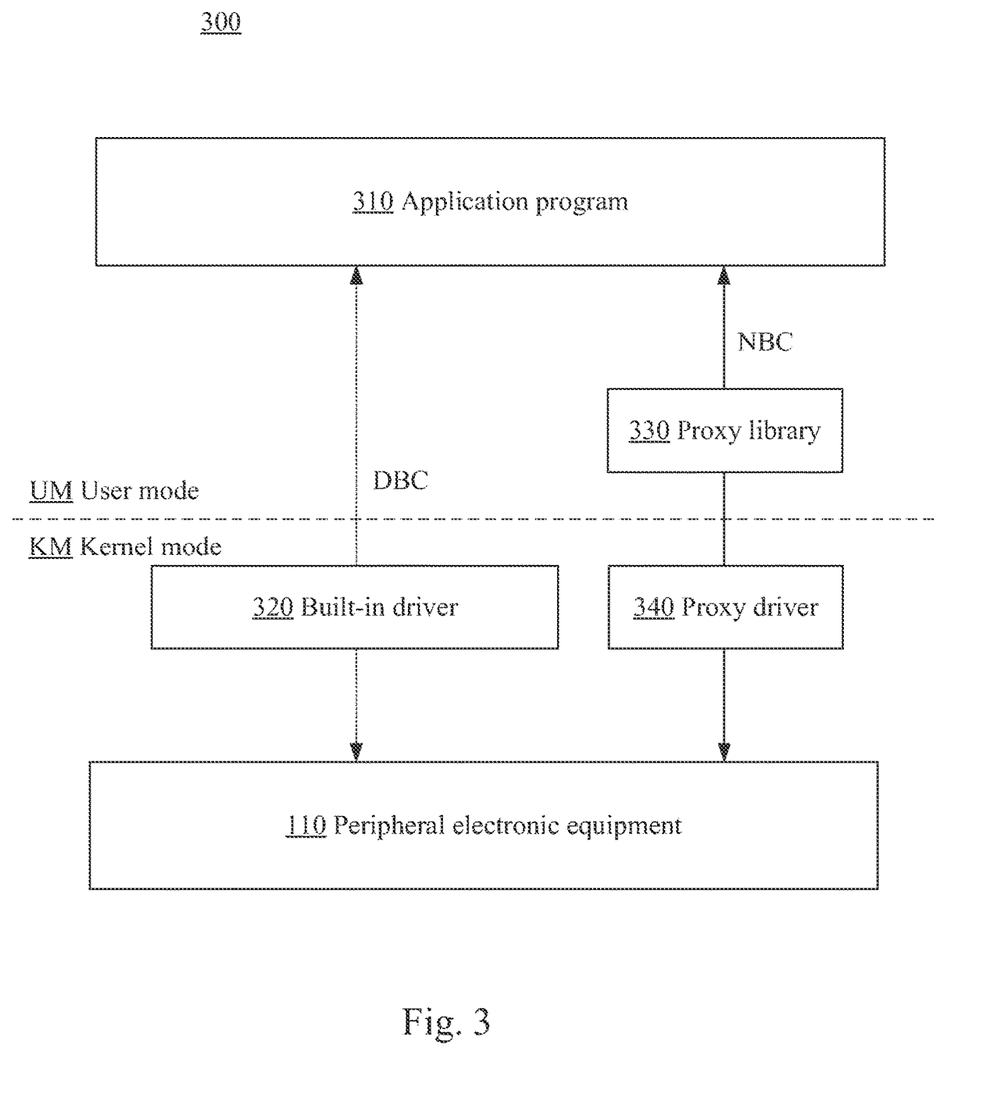
FIG. 3 illustrates a block diagram of a system that the electronic apparatus establishes based on the communication method according to another embodiment of the present invention.

Reference is now made to FIG. 2 and FIG. 3 at the same time to describe the operation of the electronic apparatus 100 according to an embodiment of the present invention.

FIG. 2 illustrates a flow chart of a communication method 200 having both defined and undefined bus communication mechanism used in such as, but not limited to the electronic apparatus 100 in FIG. 1 according to an embodiment of the present invention.

FIG. 3 illustrates a block diagram of a system 300 that the electronic apparatus 100 establishes based on the communication method 200 according to an embodiment of the present invention.

The system 300 is divided as two parts that respectively correspond to a part that a user mode UM of an operation system (not illustrated) operated in the electronic apparatus 100 can access and a part that a kernel mode KM of the operation system can access.

The application program 310 corresponds to the user mode UM, in which the user mode UM can be operated by a user and has limited hardware access authority. The peripheral electronic equipment 110 corresponds to the kernel mode KM, in which the kernel mode KM can be operated by the operation system and has thorough hardware access authority.

The components included in the system 300 are described in accompany with the flow of the communication method 200 in FIG. 2. An embodiment of the communication method 200 is illustrated in FIG. 2 and includes steps outlined below.

In step S210, a connection between an application program 310 and the peripheral electronic equipment 110 is established through a built-in driver 320 operated in the operation system of the electronic apparatus 100, wherein the application program 310 is related to the peripheral electronic equipment 110 and the built-in driver 320 is operated in the kernel mode KM.

In step S220, a proxy library 320 and a proxy driver 330 are activated by the application program 310, wherein the proxy library 320 corresponds to the user mode UM of the operation system and the proxy driver 330 corresponds to the kernel mode KM of the operation system.

Figure 4:
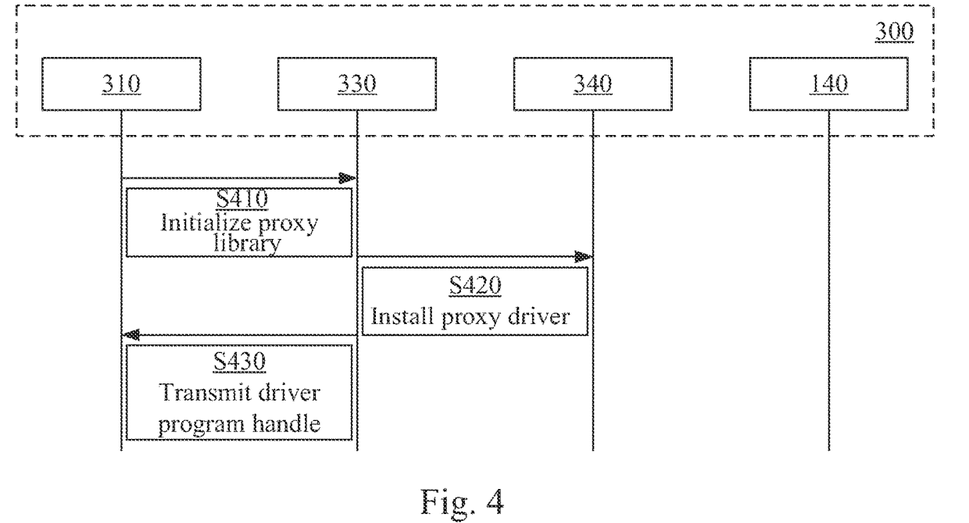
FIG. 4 illustrates a timing diagram of the operation of the system in FIG. 3 according to an embodiment of the present invention.

Reference is now made to FIG. 4. FIG. 4 illustrates a timing diagram of the operation of the system 300 in FIG. 3 according to an embodiment of the present invention. The detailed content included in step S220 of FIG. 2 is described in accompany with steps performed along with the timings of the operation of the components in the system 300 illustrated in FIG. 4, in which the order of the timings are illustrated from up to down. The operation of step S220 is not related to the built-in driver 320. As a result, the built-in driver 320 is not illustrated in FIG. 4.

In step S410, the proxy library 330 is initialized by the application program 310.

In step S420, the proxy driver 340 is installed by the proxy library 330 and a driver program handle of the proxy driver 340 is configured by the proxy library 330 to further establish a connection between the proxy driver 340 and the application program 310. The driver program handle is used by the application program 310 and the proxy library 330 to reference and manage the proxy driver 340.

In step S430, the driver program handle is transmitted by the proxy library 330 to the application program 310 to be stored thereby.

Further, in step S230 of the flow in FIG. 2, a connection between a combination of the proxy library 330 and the proxy driver 340 and the peripheral electronic equipment 110 are established by the application program 310.

Figure 5:
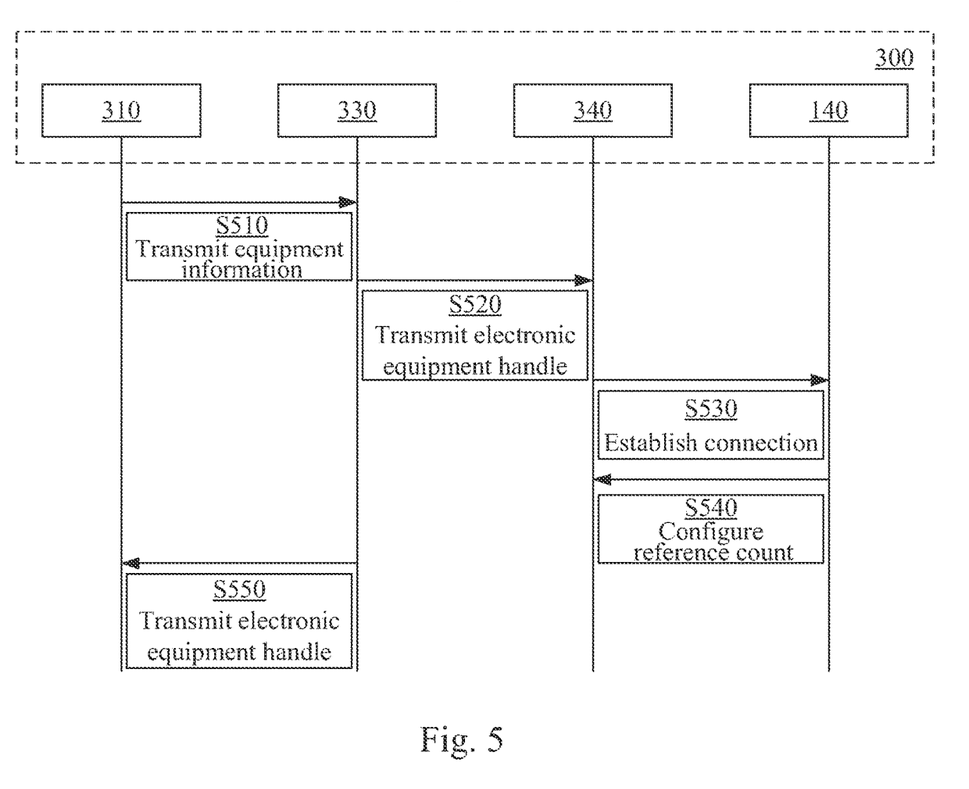
FIG. 5 illustrates a timing diagram of the operation of the system in FIG. 3 according to another embodiment of the present invention.

Reference is now made to FIG. 5. FIG. 5 illustrates a timing diagram of the operation of the system 300 in FIG. 3 according to another embodiment of the present invention. The detailed content included in step S230 of FIG. 2 is described in accompany with steps performed along with the timings of the operation of the components in the system 300 illustrated in FIG. 5, in which the order of the timings are illustrated from up to down. The operation of step S220 is not related to the built-in driver 320. As a result, the built-in driver 320 is not illustrated in FIG. 5.

In step S510, equipment information related to the peripheral electronic equipment 110 is transmitted to the proxy library 330 by the application program 310.

In step S520, an electronic equipment handle of the peripheral electronic equipment 110 is retrieved and configured to transmit the electronic equipment handle to the proxy driver 340 by the proxy library 330.

In step S530, the peripheral electronic equipment 110 is discovered according to the electronic equipment handle and a connection with the peripheral electronic equipment 110 is established by the proxy driver 340.

In step S540, the peripheral electronic equipment 110 is controlled to configure a reference count corresponding to the application program 310.

In step S550, the electronic equipment handle is transmitted to the application program 310 by the proxy library 330.

Subsequently, in step S240 of the flow in FIG. 2, transmitting and receiving of defined commands DBC that are defined by the built-in driver 320 are performed through the bus 120 with the peripheral electronic equipment 110 by the application program 310 by using the built-in driver 320.

The defined commands DBC defined by the built-in driver 320 includes such as, but not limited to a standard request and a class request. The standard request can be applied to all different types of the equipments that matching the protocol of the bus 120. On the other hand, the class request may vary when different types of the equipments (e.g., the storage equipment and the digital image-retrieving equipment) are used.

Further, in step S250 of the flow in FIG. 2, transmitting and receiving of non-defined commands NBC that are not defined by the built-in driver 320 are performed with the peripheral electronic equipment 110 by the application program 310 by using the proxy library 330 and the proxy driver 340.

In an embodiment, the proxy library 330 performs data conversion corresponding to the bus 120 on the non-defined commands NBC such that the commands not defined by the built-in driver 320 can also be transmitted through the bus 120. The non-defined commands can be such as, but not limited to an access request or a connection terminating request.

Figure 6:
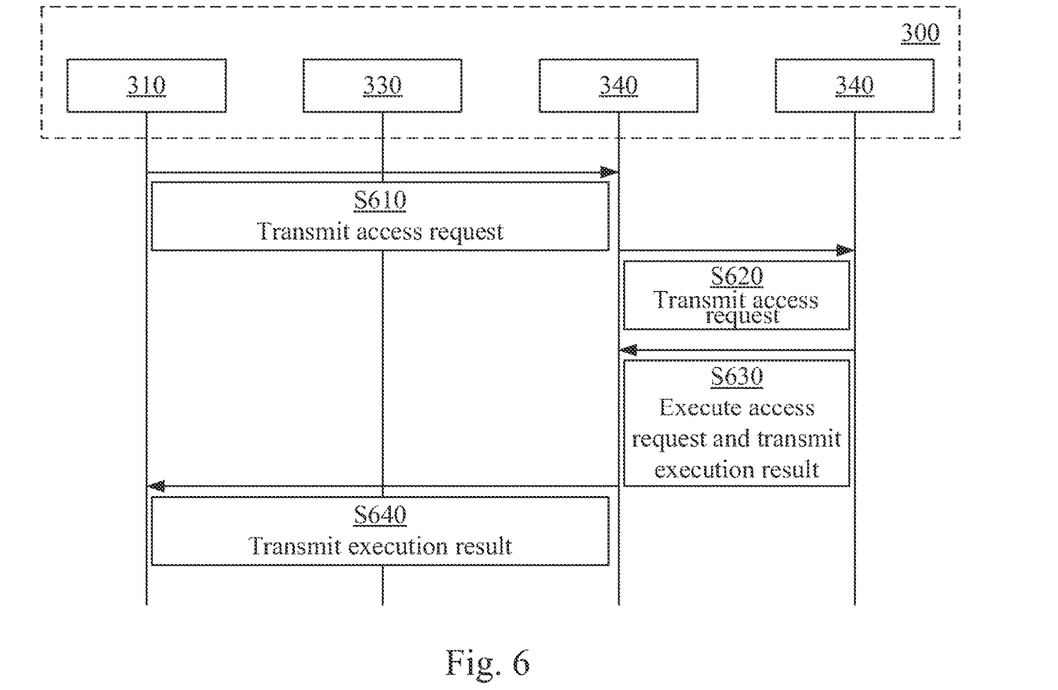
FIG. 6 illustrates a timing diagram of the operation of the system in FIG. 3 according to yet another embodiment of the present invention.

Reference is now made to FIG. 6. FIG. 6 illustrates a timing diagram of the operation of the system 300 in FIG. 3 according to yet another embodiment of the present invention. When one of the non-defined commands is an access request, the detailed content included in step S250 of FIG. 2 is described in accompany with steps performed along with the timings of the operation of the components in the system 300 illustrated in FIG. 6, in which the order of the timings are illustrated from up to down. The operation of step S250 is not related to the built-in driver 320. As a result, the built-in driver 320 is not illustrated in FIG. 6.

In step S610, the access request is transmitted to the proxy driver 340 through the proxy library 330 by the application program 310.

In step S620, the access request is transmitted to the peripheral electronic equipment 110 by the proxy driver 340.

In step S630, the access request is executed by the peripheral electronic equipment 110 to transmit an access request execution result to the proxy driver 340.

In step S640, the access request execution result is transmitted to the application program 310 through the proxy library 330 by the proxy driver 340.

Figure 7:
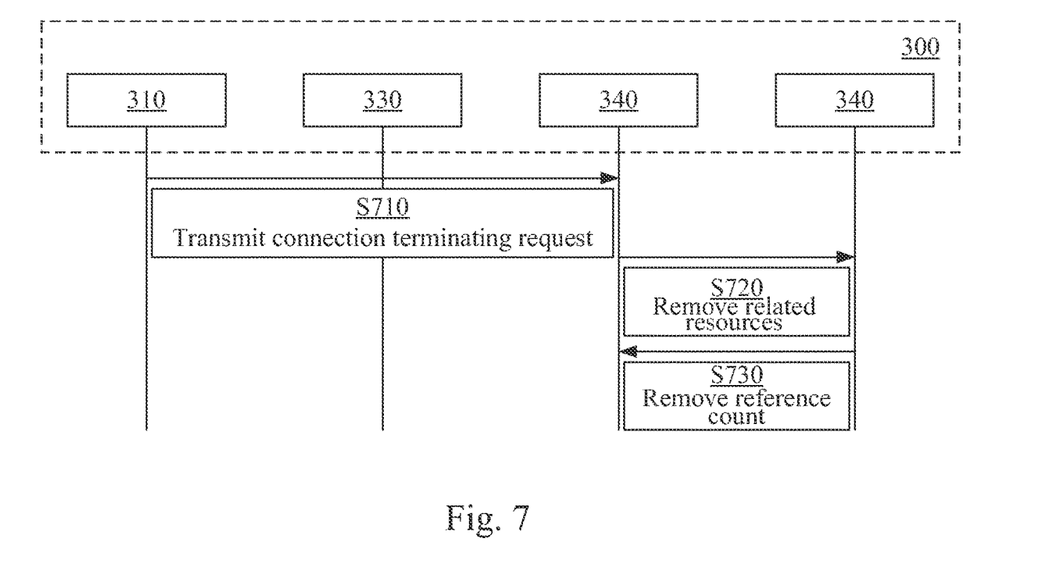
FIG. 7 illustrates a timing diagram of the operation of the system in FIG. 3 according to still another embodiment of the present invention.

Reference is now made to FIG. 7. FIG. 7 illustrates a timing diagram of the operation of the system 300 in FIG. 3 according to still another embodiment of the present invention. When one of the non-defined commands is a connection terminating request, the detailed content included in step S250 of FIG. 2 is described in accompany with steps performed along with the timings of the operation of the components in the system 300 illustrated in FIG. 7, in which the order of the timings are illustrated from up to down. The operation of step S250 is not related to the built-in driver 320. As a result, the built-in driver 320 is not illustrated in FIG. 7.

In step S710, the connection terminating request is transmitted to the proxy driver 340 through the proxy library 330 by the application program 310.

In step S720, resources related to the peripheral electronic equipment 110 are removed by the proxy driver 340.

In step S730, the peripheral electronic equipment 110 is controlled to remove the reference count corresponding to the application program 310.

In some approaches, either a preserved interface is required in the built-in driver or a new driver is required to replace the built-in driver in order to perform communication of non-defined commands. However, lots of limitations are presented in the preserved interface in the built-in driver. The new driver costs higher and may affect the transmission of the standard defined commands.

The proxy driver in the present invention is not loaded to the peripheral electronic equipment and is merely disposed in the kernel mode by the proxy library. As a result, the transmission of the non-defined commands can be performed under the condition that the functions of the standard defined commands are not affected and the driver is not required to be newly designed.

The above embodiments merely describe the operation of transmitting and receiving the non-defined commands performed by the application program by using the proxy library and the proxy driver. In some embodiments, transmitting and receiving of the defined commands can also be selectively performed with the peripheral electronic equipment by the application program by using the proxy library and the proxy driver through the bus.

It is appreciated that the embodiments described above are merely an example. In other embodiments, it should be appreciated that many modifications and changes may be made by those of ordinary skill in the art without departing, from the spirit of the disclosure.

In summary, the present invention discloses the electronic apparatus and the communication method thereof having both defined and undefined bus communication mechanism that perform communication of non-defined commands by disposing a proxy library and a proxy driver such that the communication of standard defined commands is not affected and drivers are not required to be newly designed.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. An electronic apparatus having both defined and undefined bus communication mechanism, comprising:
    a peripheral electronic equipment;
    a bus;
    a storage circuit configured to store a computer executable command; and
    a processing circuit configured to retrieve and execute the computer executable command to execute a communication method comprising:
        establishing a connection between an application program and the peripheral electronic equipment through a built-in driver operated in an operation system, wherein the application program is related to the peripheral electronic equipment;
        activating a proxy library and a proxy driver by the application program, wherein the proxy library corresponds to a user mode of the operation system and the proxy driver corresponds to a kernel mode of the operation system;
        establishing a connection between a combination of the proxy library and the proxy driver and the peripheral electronic equipment by the application program;
        performing transmitting and receiving of defined commands that are defined by the built-in driver through the bus with the peripheral electronic equipment by the application program by using the built-in driver; and performing transmitting and receiving of non-defined commands that are not defined by the built-in driver with the peripheral electronic equipment by the application program by using the proxy library and the proxy driver.

2. The electronic apparatus of claim 1, wherein the step of activating the proxy library and the proxy driver by the application program further comprises:
initializing the proxy library by the application program;
installing the proxy driver by the proxy library and configuring a driver program handle of the proxy driver to further establish a connection between the proxy driver and the application program; and
transmitting the driver program handle by the proxy library to the application program to be stored thereby.

3. The electronic apparatus of claim 1, wherein the step of establishing the connection between the combination of the proxy library and the proxy driver and the peripheral electronic equipment by the application program further comprises:
transmitting equipment information related to the peripheral electronic equipment to the proxy library by the application program;
retrieving and configuring an electronic equipment handle of the peripheral electronic equipment to transmit the electronic equipment handle to the proxy driver by the proxy library;
discovering the peripheral electronic equipment according to the electronic equipment handle and establish a connection with the peripheral electronic equipment by the proxy driver;
controlling the peripheral electronic equipment to configure a reference count corresponding to the application program; and
transmitting the electronic equipment handle to the application program by the proxy library.

4. The electronic apparatus of claim 1, wherein one of the non-defined commands is an access request, the communication method further comprising:
transmitting the access request to the proxy driver through the proxy library by the application program;
transmitting the access request to the peripheral electronic equipment by the proxy driver;
executing the access request by the peripheral electronic equipment to transmit an access request execution result to the proxy driver; and
transmitting the access request execution result to the application program through the proxy library by the proxy driver.

5. The electronic apparatus of claim 1, wherein one of the non-defined commands is a connection terminating request, the communication method further comprising:
transmitting the connection terminating request to the proxy driver through the proxy library by the application program;
removing resources related to the peripheral electronic equipment by the proxy driver; and
controlling the peripheral electronic equipment to remove a reference count corresponding to the application program.

6. The electronic apparatus of claim 1, wherein the communication method further comprises:
performing data conversion corresponding to the bus on the non-defined commands by the proxy library.

7. The electronic apparatus of claim 1, wherein the bus is a universal serial bus.

8. The electronic apparatus of claim 1, wherein the defined commands comprise a standard request and a class request.

9. The electronic apparatus of claim 1, wherein the communication method further comprises:
performing transmitting and receiving of the defined commands with the peripheral electronic equipment through the bus by the application program by using the proxy library and the proxy driver.

10. A communication method having both defined and undefined bus communication mechanism used in an electronic apparatus, comprising:
establishing a connection between an application program and a peripheral electronic equipment through a built-in driver operated in an operation system of the electronic apparatus, wherein the application program is related to the peripheral electronic equipment;
activating a proxy library and a proxy driver by the application program, wherein the proxy library corresponds to a user mode of the operation system and the proxy driver corresponds to a kernel mode of the operation system;
establishing a connection between a combination of the proxy library and the proxy driver and the peripheral electronic equipment by the application program;
performing transmitting and receiving of defined commands that are defined by the built-in driver through a bus with the peripheral electronic equipment by the application program by using the built-in driver; and
performing transmitting and receiving of non-defined commands that are not defined by the built-in driver with the peripheral electronic equipment by the application program by using the proxy library and the proxy driver.

11. The communication method of claim 10, wherein the step of activating the proxy library and the proxy driver by the application program further comprises:
initializing the proxy library by the application program;
installing the proxy driver by the proxy library and configuring a driver program handle of the proxy driver to further establish a connection between the proxy driver and the application program; and
transmitting the driver program handle by the proxy library to the application program to be stored thereby.

12. The communication method of claim 10, wherein the step of establishing the connection of the combination of the proxy library and the proxy driver and the peripheral electronic equipment by the application program further comprises:
transmitting equipment information related to the peripheral electronic equipment to the proxy library by the application program;
retrieving and configuring an electronic equipment handle of the peripheral electronic equipment to transmit the electronic equipment handle to the proxy driver by the proxy library;
discovering the peripheral electronic equipment according to the electronic equipment handle and establish a connection with the peripheral electronic equipment by the proxy driver;
controlling the peripheral electronic equipment to configure a reference count corresponding to the application program; and
transmitting the electronic equipment handle to the application program by the proxy library.

13. The communication method of claim 10, wherein one of the non-defined commands is an access request, the communication method further comprising:
- transmitting the access request to the proxy driver through the proxy library by the application program;
- transmitting the access request to the peripheral electronic equipment by the proxy driver;
- executing the access request by the peripheral electronic equipment to transmit an access request execution result to the proxy driver; and
- transmitting the access request execution result to the application program through the proxy library by the proxy driver.

14. The communication method of claim 10, wherein one of the non-defined commands is a connection terminating request, the communication method further comprising:
- transmitting the connection terminating request to the proxy driver through the proxy library by the application program;
- removing resources related to the peripheral electronic equipment by the proxy driver; and
- controlling the peripheral electronic equipment to remove a reference count corresponding to the application program.

15. The communication method of claim 10, further comprising:
- performing data conversion corresponding to the bus on the non-defined commands by the proxy library.

16. The communication method of claim 10, wherein the bus is a universal serial bus.

17. The communication method of claim 10, wherein the defined commands comprise a standard request and a class request.

18. The communication method of claim 10, further comprising:
- performing transmitting and receiving of the defined commands with the peripheral electronic equipment through the bus by the application program by using the proxy library and the proxy driver.

* * * * *